ELECTRON BEAM DEFLECTION AND LOW VOLTAGE SUPPLY CIRCUIT

Filed Aug. 6, 1965

INVENTOR.
GUSTAVE L. GRUNDMANN
BY
Eugene M. Whitacre
Attorney

April 1, 1969 G. L. GRUNDMANN 3,436,591

ELECTRON BEAM DEFLECTION AND LOW VOLTAGE SUPPLY CIRCUIT

Filed Aug. 6, 1965 Sheet 2 of 2

INVENTOR.
GUSTAVE L. GRUNDMANN
BY
Eugene M. Whitacre
Attorney

United States Patent Office 3,436,591

Patented Apr. 1, 1969

3,436,591
ELECTRON BEAM DEFLECTION AND LOW VOLTAGE SUPPLY CIRCUIT

Gustave Louis Grundmann, Indianapolis, Ind., assignor to Radio Corporation of America, a corporation of Delaware Filed Aug. 6, 1965, Ser. No. 477,718
Int. Cl. H01j 29/70
U.S. Cl. 315—27 7 Claims

ABSTRACT OF THE DISCLOSURE

A deflection circuit for a cathode ray tube includes a switching device such as a silicon controlled rectifier which is conductive during the retrace portion of each deflection cycle. A filter network comprising the parallel combination of a resistor and a capacitor is coupled in series with the switching device so as to develop a source of relatively low direct voltage for supplying additional circuits.

Figure 1:
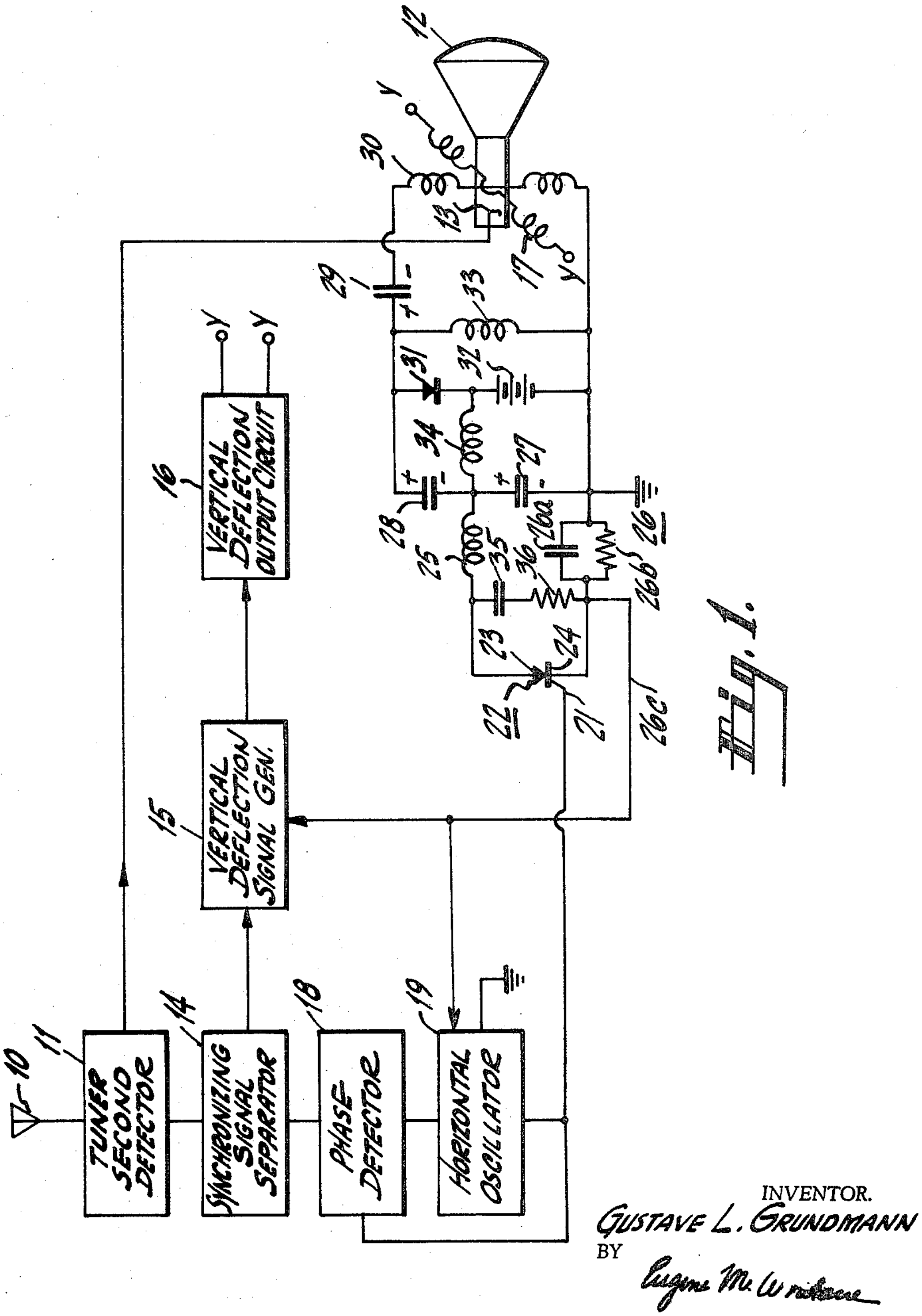

This invention relates to combined electron beam deflection and voltage supply circuits and, in particular, to such a circuit wherein energy is supplied to the deflection circuit at least during the retrace portion of a deflection cycle by means of a solid state semiconductor device such as a silicon controlled rectifier. In accordance with the present invention, means are provided for utilizing, in an advantageous manner, the current which passes through the rectifier to develop a low voltage supply for additional parts of a television receiver.

The invention is particularly useful in connection with horizontal deflection circuits for television receivers and will be described further in connection with use in such apparatus.

Numerous circuit designs for completely transistorized television receivers either have been constructed or have been described in detail in various technical publications. One of the most troublesome areas in such transistor receivers, from the point of view of reliability and economy, lies in the horizontal deflection circuits.

The high voltages and high currents encountered in such deflection circuits generally require the use of power switching transistors. A deflection circuit for television receivers utilizing reliable, high speed sold state switching devices of the silicon controlled rectifier type, which provides a cost saving, improved performance and improved reliability over deflection circuits utilizing power switching transistors, has been described in the U.S. patent application Ser. No. 411,194, filed Nov. 16, 1964, now Patent No. 3,365,608, of Gustave L. Grundmann and James J. Serafini entitled "Electron Beam Deflection Circuit." The deflection circuit described in the Grundmann and Serafini application is supplied with power by means of a relatively low direct voltage source (e.g. of the order of twenty volts).

In a television receiver designed for line cord operation (i.e. for operation from a standard 115-volt alternating current household supply), a primary direct supply voltage of approximately 140 volts may be derived readily and relatively inexpensively by means of a rectifier-filter circuit without the need for an expensive power transformer. However, many presently available types of transistors suitable for television receiver design require a direct supply voltage of, for example, twenty to thirty volts. Consistent with the desire for economical design, it would be advantageous to provide, in a line cord operated transistor television receiver, means other than a power transformer for developing the relatively low direct supply voltage utilized in connection with the above-mentioned types of transistors.

In accordance with the present invention, a deflection circuit utilizing a silicon controlled rectifier such as the circuit described in the Grundmann and Serafini application may be adapted for operation from a relatively high direct voltage supply (e.g. 140 volts) and furthermore, means associated with the deflection circuit may be provided for deriving a low voltage (e.g. 20 volts) for use in other portions of a television receiver without deleteriously affecting the operation (particularly the linearity) of the deflection circuits.

In accordance with the present invention, an electron beam deflection and voltage supply circuit for use in a television receiver comprises a deflection winding and means for coupling the winding across a first substantially constant voltage supply during the trace portion of an electron beam deflection cycle. One or more energy storage capacitors, coupled across the deflection winding, supply energy to the deflection winding during the retrace portion of the cycle. Retrace is initiated by rendering conductive a solid state controlled rectifier which is coupled across an energy storage capacitor. The controlled rectifier is triggered to a state of conduction at the beginning of the retrace portion of the cycle and continues conducting throughout the retrace portion. Advantageously, the rectifier further continues to conduct for a portion of the trace period of the cycle. The controlled rectifier is turned off (returned to a "forward blocking state") by means of a reverse current supplied to the rectifier by one or more of the energy storage capacitors. The parallel combination of a load resistor and a further energy storage capacitor is coupled in series relation with the controlled rectifier and serves to develop, from the rectifier current, a second substantially constant voltage supply of lower voltage than the first supply, the second supply providing power for operation of other portions of the television receiver.

Figure 2:
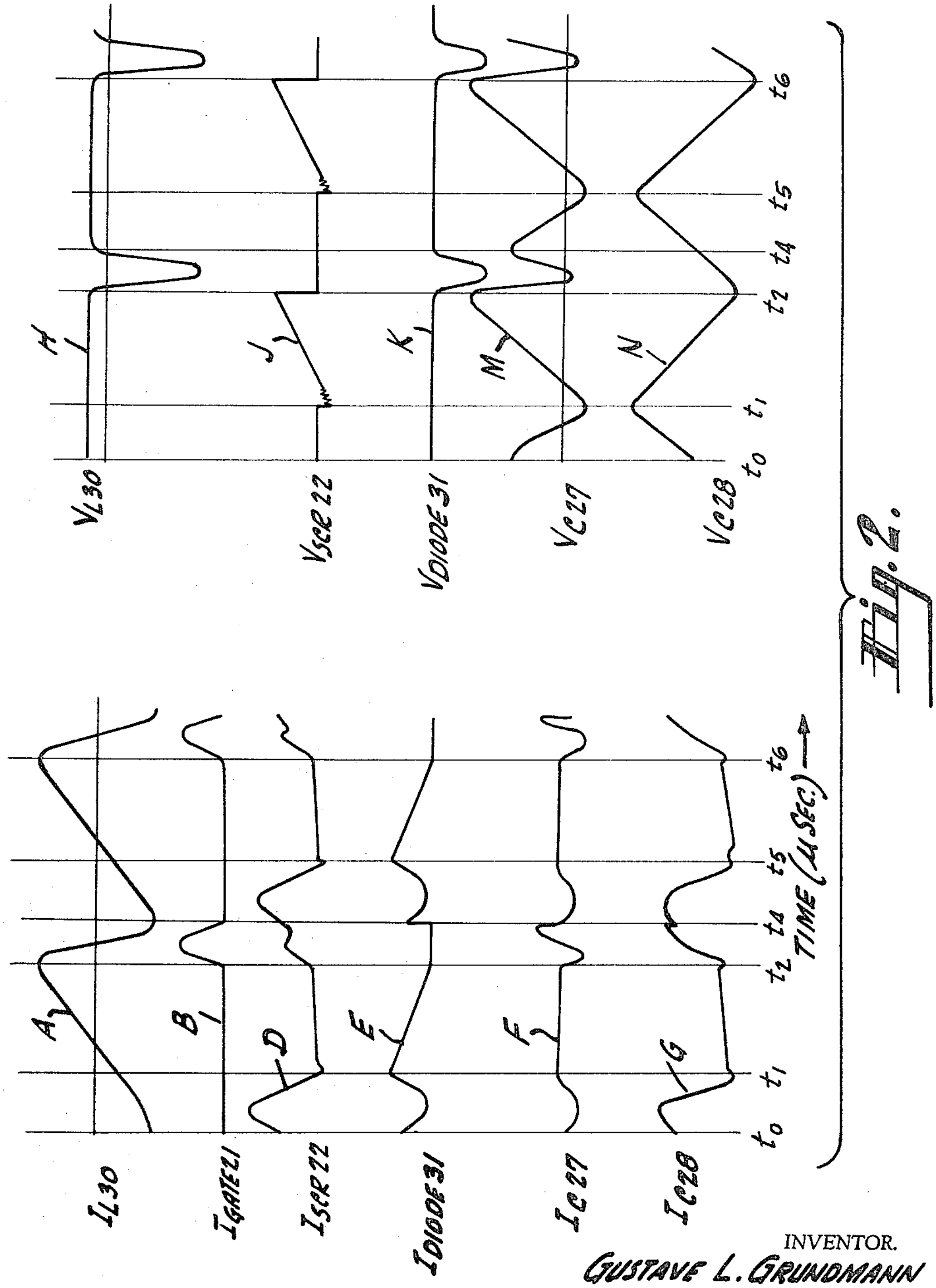

The novel features that are considered characteristic of this invention are set forth with particularity in the appended claims. The invention, itself, however, both as to its organization and method of operation, as well as additional objects and advantages thereof, will best be understood from the following description when read in connection with the accompanying drawing, in which:

FIGURE 1 is a schematic circuit diagram, partially in block diagram form, of a television receiver embodying the invention; and FIGURE 2 is a series of waveform diagrams (not drawn to scale) to which reference will be made in the explanation of the operation of the circuit of FIGURE 1.

Referring now to FIGURE 1 of the drawing, an embodiment of the invention will be described as it may be used in a typical television receiver. The television receiver includes an antenna 10 which receives television signals and couples the received signals to a tuner-detector-amplifier 11. The tuner-detector-amplifier 11 normally includes a radio frequency amplifier, a frequency converter for converting radio frequency signals to intermediate frequency signals, an intermediate frequency amplifier, a detector for deriving composite television signals from the intermediate frequency signals, and a video amplifier. The amplified composite television signal produced by the video amplifier is applied to a control electrode such as the cathode 13 of a television kinescope 12. The detected composite television signal is also applied from tuner-detector-amplifier 11 to a synchronizing signal separator circuit 14. The sync separator circuit 14 supplies vertical synchronizing pulses to a vertical deflection signal generator 15. Vertical deflection signal generator 15 is connected to a vertical deflection output circuit 16, terminals Y—Y of which are connected to a deflection yoke winding 17 of kinescope 12.

Horizontal synchronizing pulses are derived from sync separator circuit 14 and are supplied to a phase detector 18, the latter also being supplied with the signal generated by a horizontal oscillator 19. An error voltage is developed in phase detector 18 and applied to horizontal oscillator 19 to synchronize the output of the latter with the horizontal synchronizing pulses. The signal developed by horizontal oscillator 19 is applied to the gate electrode 21 of a solid state controlled rectifier such as a silicon controlled rectifier 22. Silicon controlled rectifier 22 further comprises an anode electrode 23 and a cathode electrode 24. Anode 23 is coupled to a relatively small inductor 25. Means for developing a relatively low direct supply voltage 26 are coupled in series relation with respect to rectifier 22 between cathode 24 and a reference voltage such as ground. The low voltage supply 26 comprises an energy storage capacitor 26a. A resistor 26b, representative of the load on supply 26, such as other portions of the receiver, is shown coupled across capacitor 26a. A second energy storage capacitor 27 is coupled from the end of inductor 25 remote from anode 23 to ground. A third energy storage capacitor 28 is provided having one terminal coupled to the junction of inductor 25 and capacitor 27 and the other terminal coupled to the series combination of a D-C blocking capacitor 29 and a horizontal deflection winding 30. A diode 31 and a relatively high voltage supply 32 are also coupled in series across the combination of capacitor 29 and winding 30. A relatively large inductor 33 is coupled in circuit with the series combination of diode 31 and high voltage supply 32 to provide a direct current path for the diode. Similarly, a relatively large inductor 34 is coupled from the junction of diode 31 and supply 32 to the junction of capacitors 27 and 28 to provide a path for charging current from supply 32 to capacitors 27 and 28. A pulse suppressing circuit consisting of a capacitor 35 and a resistor 36 is coupled between anode 23 and cathode 24 of rectifier 22.

In operation, a television signal at radio frequency is received by antenna 10. The received signal is amplified, converted to an intermediate frequency (I-F) signal and demodulated, the demodulated video signal then being amplified further, the above operations all being performed by tuner-detector-amplifier 11. The video signals appearing at the output of tuner-detector-amplifier 11 are applied to the cathode 13 of kinescope 12. The demodulated television signal also is applied to synchronizing signal separator circuit 14. Sync separator circuit 14 separates the deflection synchronizing signals from the composite television signal and supplies vertical synchronizing signals to vertical deflection signal generator 15 and horizontal synchronizing signals to phase detector 18. Output pulses generated by vertical deflection signal generator 15 are supplied to vertical deflection output circuit 16 which, in turn, supplies a suitable sawtooth of current at field frequency to the vertical deflection winding 17 coupled across terminals Y—Y.

The waveform generated by horizontal oscillator 19, or, in the alternative, a portion of the deflection waveform produced in winding 30 (either of which recurs at a nominal frequency of 15,750 cycles per second) is applied to phase detector 18. The applied signal is compared in phase detector 18 with the horizontal synchronizing pulses supplied to phase detector 18 from sync separator circuit 14. Phase detector 18 develops an error voltage which, in turn, is applied to horizontal oscillator 19 to control the oscillator phase and frequency.

The horizontal output pulses produced by oscillator 19 are shaped so as to provide positive pulses having, for example, a width of 5 to 10 microseconds and a repetition rate of 15,750 pulses per second.

The positive pulses so formed are coupled to gate electrode 21 of silicon controlled rectifier 22. The silicon controlled rectifier 22, as will be described more fully below, initiates the retrace portion of the horizontal deflection cycle each time such a pulse is applied to gate electrode 21.

Referring to FIGURE 2, current and voltage waveforms at various points in the circuit of FIGURE 1 are shown for two complete deflection cycles. The trace portion of the first full deflection cycle is indicated as occurring during the time interval $t_0$–$t_2$ while the retrace portion of the cycle occurs during the interval $t_2$–$t_4$. Typically, the interval $t_0$–$t_2$ is about 53 microseconds in duration while the interval $t_2$–$t_4$ is about 10.5 microseconds in duration.

In referring to the waveforms shown in FIGURE 2, the polarities of voltages and the directions of current flow are defined with reference to the polarity markings shown on the circuit components in FIGURE 1. Currents are defined as positive when flowing from positive to negative potential through a given component.

During the trace portion of each deflection cycle, diode 31 serves to clamp the combination of capacitor 29 and deflection winding 30 to the substantially constant direct voltage provided by high voltage supply 32. The waveform A of FIGURE 2 indicates the current flowing through winding 30 changes in a substantially linear manner throughout this trace interval ($t_0$–$t_2$). As is shown in the drawing, the current through deflection winding 30 at the beginning of the trace interval flows in a first direction and decreases linearly, then passes through zero, and thereafter increases linearly but flows in the opposite direction. According to the sign convention adopted herein the current through winding 30 is negative at the beginning of trace and positive at the end thereof.

During the retrace interval ($t_1$–$t_4$), the current in deflection winding 30 returns in a substantially sinusoidal manner to the value which it had reached at the start of the previous trace interval. Ideally, the negative and positive peak values of current flowing in winding 30 are substantially equal and are selected for a given application according to the energy required to deflect a given electron beam across the phosphor-coated screen of the associated kinescope 12. The illustrated deflection current waveform is produced in the following manner.

Specifically, considering an entire deflection cycle, immediately prior to initiation of the retrace portion of the deflection cycle (e.g., immediately prior to time $t_2$) diode 31 is biased for forward conduction and a substantially constant voltage derived from voltage supply 32 (see trace portion of waveform H) is coupled across deflection winding 30. At time $t_2$, a positive current pulse (waveform B) is supplied in timed relation with the occurrence of the horizontal synchronizing signal from oscillator 19 to gate electrode 21 of silicon controlled rectifier 22. Rectifier 22 is switched to its high conduction (low impedance) state causing capacitor 27 to begin to discharge in a substantially sinusoidal manner through the relatively short time constant resonant circuit which includes, principally, inductor 25, rectifier 22 and low voltage supply 26. Energy is thereby transferred to low voltage supply 26. The rapid drop in voltage across capacitor 27 is coupled to diode 31 by means of capacitor 28. Diode 31 becomes reverse biased and opens (i.e. returns to a high impedance state), removing the constant voltage from across deflection winding 30. The discharge of capacitor 27 and the resultant opening of diode 31 creates a disturbance in the resonant circuit comprising capacitors 27 and 28, inductors 25 and 33 and winding 30. The voltage across and current through winding 30 therefore undergo a portion of a cycle of substantially sinusoidal oscillation (see waveforms A and H). The period of the last-mentioned resonant circuit is adjusted, for example, to twice the retrace interval.

At time $t_4$ (or time $t_1$) which is the end of the retrace interval, the capacitors 27 and 28 have attained charges such that the algebraic sum of the voltages across such capacitors (and thereby the voltage across winding 30) is of such a polarity and magnitude to forward bias diode 31 once again. The current through deflection winding 30, under the influence of the substantially constant voltage supplied by the combination of voltage supply 32 and diode 31, returns to the linear trace waveform. During the first portion of the trace interval a component of yoke current flows through the forward biased diode 31 to return energy to voltage supply 32. A second component of the yoke current returns energy to capacitor 28 and to low voltage supply 26 via inductor 25 and silicon controlled rectifier 22. This last-mentioned component of yoke current diminishes the current flowing from deflection winding 30 through diode 31 (see waveforms E and G between, e.g., time $t_4$ and time $t_5$).

During this last-named interval, as well as the remainder of the trace portion of the deflection cycle, energy transfers which occur with respect to capacitors **26*a*, 27 and 28 have substantially no effect upon the desired linear deflection current produced in winding 30 by virtue of the fact that diode 31 remains conductive and maintains the desired constant voltage across winding 30** throughout the entire trace portion of the cycle.

As is shown in waveform D, silicon controlled rectifier 22 continues to conduct in the forward direction at the end of retrace and, in fact, continues to conduct during a portion of the trace interval (i.e., from time $t_4$ to time $t_5$ or from time $t_0$ to time $t_1$) as the portion of the deflection current supplied to capacitor 28 decreases towards zero. The resonant periods of a first circuit comprising inductor 25, capacitor 28 and winding 30 and a second circuit comprising inductor 25 and capacitor 27 are proportioned with respect to the duration of the retrace interval such that the sum of the currents from capacitors 27 and 28 flowing through rectifier 22 into voltage supply 26 is positive at the end of retrace. Inductor 34, because of its relatively large value, may be neglected in the following analysis of the circuit during the trace interval.

With both diode 31 and rectifier 22 in the state of forward conduction, capacitors 27 and 28 effectively are coupled in parallel one with the other, the parallel combination being coupled across the series combination of low voltage supply 26, controlled rectifier 22 and inductor 25. The oscillation period of the resonant circuit comprising the parallel combination of capacitors 27 and 28 in series with inductor 25 determines the duration of conduction of rectifier 22 during the trace portion of the deflection cycle. The last-named resonant circuit provides means for extinguishing the flow of current through rectifier 22 in the following manner. At time $t_0$, as diode 31 is switched "on," a sinusoidal oscillation commences in the circuit comprising inductor 25, capacitor 27, capacitor 28 and rectifier 22 (see waveform D—current through rectifier 22). It should be noted that during the beginning of the trace interval the current flowing through rectifier 22 is made up of the sum of the currents from capacitors 27 and 28. As is shown in waveform D, during the beginning of the trace interval the current through rectifier 22 initially increases, then decreases sharply, passing through zero. The current then begins to increase slightly in the negative sense. However, the flow of negative current through rectifier 22 (i.e., from cathode to anode) serves to switch rectifier 22 "off" (i.e., into a high impedance state). The rapid switching of rectifier 22 tends to produce a ringing between the circuit inductance (e.g., inductor 25) and the relatively small inter-electrode capacitance of rectifier 22 (see pulse at time $t_1$ in waveform J). Resistor 36 and capacitor 35 serve to damp the ringing such that the negative current flowing through rectifier 22 decreases exponentially towards zero, rectifier 22 thereafter presenting a very high impedance to current flow.

Upon termination of conduction in controlled rectifier 22, capacitors 27 and 28 are charged via inductors 33 and 34 by the high voltage (+140 volt) supply 32.

It can be seen in waveform D, FIGURE 2, that a substantial unidirectional current flows through controlled rectifier 22 during the retrace interval and a portion of the trace interval. This current is derived principally from the charge stored in storage capacitors 27 and 28 during the trace portion of each cycle. The energy thus stored in capacitors 27 and 28 is supplied partially to deflection winding 30 and partially to voltage supply 26. The parallel combination of resistor **26*b* and capacitor 26*a* serve to convert the pulses of direct current supplied by rectifier 22 to a substantially constant voltage which may be used to supply B+ voltage via lead 26*c* to additional circuits such as horizontal oscillator 19, vertical deflection generator 15, etc., as well as the heater for kinescope 12** in the television receiver. The illustrated circuit therefore functions simultaneously as a deflection circuit and a D-C voltage converter (e.g., from 140 volts to 20 volts).

It should be noted that the capacitances of capacitors 27 and 28 are selected in a ratio one with respect to the other and with respect to other parameters of the circuit so that the sum of the resultant voltages across such capacitors (1) maintains the diode 31 conductive during the trace interval, and (2) drops to a low enough value during the retrace interval so that the diode 31 may be cut off.

Furthermore, such components advantageously may be selected so that silicon controlled rectifier 22 is maintained in a state of forward conduction throughout a part of the trace portion of a deflection cycle so as to permit a reduction in the peak current handling capabilities of rectifier 22 (i.e., to permit flow of charging current over a period of time greater than retrace). Capacitor 29 is selected, where desirable, so as to provide "S-shaping" of the deflection current waveform.

A circuit of the type shown in FIGURE 1 has been built and tested successfully utilizing the following components:

| | |
|---|---|
| Silicon controlled rectifier **22** | G.E. Type C40D. |
| Inductor **25** | 210 microhenries. |
| Capacitor **26*a*** | 10 microfarads. |
| Capacitors **27** and **28** | 0.22 and 0.68 microfarads. |
| Capacitor **29** | 8 microfarads. |
| D-C supply **32** | 140 volts. |
| Horizontal deflection winding **30** | 750 microhenries. |
| Diode **31** | Type 1N2364B. |
| Inductors **33** and **34** | 4 millihenries. |
| Capacitor **35** | 470 micromicrofarads. |
| Resistor **36** | 1000 ohms. |

I claim:

1. In a television receiving circuit, an electron beam deflection and voltage supply circuit comprising:

a beam deflection winding, a first voltage supply means coupled in parallel with said winding for applying thereto beam deflection current during the trace portion of a beam deflection cycle, energy storage means coupled in parallel with said winding, gating signal responsive conduction means coupled to said energy storage means for initiating discharge of energy from said storage means, and second voltage supply means coupled to said conduction means for absorbing at least a portion of said discharge energy and for providing therefrom a substantially constant voltage different from that of said first voltage supply means.

2. In a television receiving circuit, an electron beam deflection and voltage supply circuit comprising:

a beam deflection winding, first voltage supply means coupled in parallel with said winding for applying thereto beam deflection current during the trace portion of a beam deflection cycle, energy store means coupled in parallel with said winding, gating signal responsive conduction means coupled to said energy storage means for initiating discharge of energy from said storage means during the retrace portion of a beam deflection cycle, and second voltage supply means coupled to said conducting means for absorbing at least a portion of said discharge energy and for providing therefrom a substantially constant voltage lower than that of said first voltage supply means.

3. In a television receiving circuit, an electron beam deflection and voltage supply circuit comprising:

a beam deflection winding, first voltage supply means coupled in parallel with said winding for applying thereto substantially linearity varying beam deflection current during the trace portion of a beam deflection cycle, capacitive energy storage means coupled in parallel with said winding, gating signal responsive conduction means connected in parallel with said energy storage means for initiating discharge of energy from said storage means during at least the retrace portion of a beam deflection cycle, and second voltage supply means coupled in series relation to said conducting means for absorbing at least a portion of said discharge energy and for producing therefrom a substantially constant voltage lower than that of said first voltage supply means.

4. In a television receiving circuit, an electron beam deflection and voltage supply circuit comprising:

a horizontal deflection winding, first voltage supply means coupled in parallel with said winding for applying thereto substantially linearity varying beam deflection current during the trace portion of a beam deflection cycle, capacitive energy storage means coupled in parallel with said winding, a silicon controlled rectifier coupled in parallel with said energy storage means and responsive to horizontal synchronizing pulses for initiating discharge of energy from said storage means during the retrace portion of a beam deflection cycle, and a parallel resistance-capacitance circuit coupled in series relation to said rectifier for absorbing at least a portion of said discharge energy and for producing therefrom a substantial constant voltage lower than that of said first voltage supply means.

5. In a television receiving circuit, an electron beam deflection and voltage supply circuit comprising:

a horizontal deflection winding, the series combination of a diode and a first voltage supply coupled in parallel with said winding for applying thereto beam deflection current during the trace portion of a beam deflection cycle, the series combination of first and second energy storage capacitors winding, the series combination of a solid state controlled rectifier, an inductor and a parallel resistance-capacitance circuit coupled in parallel with said first capacitor, said rectifier being responsive to horizontal synchronizing pulses to initiate discharge of said first and second capacitors and thereby initiate the retrace portion of a deflection cycle, said resistance-capacitance circuit being arranged to absorb energy discharged from said first and second capacitors to provide a substantially constant voltage, lower in magnitude than that of said first voltage supply, to said television receiving circuit.

6. In a retrace driven deflection system of the type including at least one solid state controlled rectifier, the combination comprising:

means including a deflection winding for providing a first circuit portion to develop a deflection current in said winding, means including impedance means connected in series with said controlled rectifier for providing a second circuit portion to develop a source of direct voltage in series with said rectifier, said second circuit portion being exclusive of said winding during retrace interval, and utilization means coupled to said impedance means.

7. In a retrace driven deflection system of the type including at least one solid state controlled rectifier, the combination of claim 6 wherein said impedance means is coupled to said controlled rectifier so as to provide a path for substantially the entire direct current passing through said rectifier.

References Cited

UNITED STATES PATENTS

| | | | |
|---|---|---|---|
| 2,995,679 | 8/1961 | Skoyles | 315—27 |
| 3,195,009 | 7/1965 | Poorter | 315—27 |
| 3,229,150 | 1/1966 | Greep et al. | 315—27 |
| 3,235,766 | 2/1966 | Martin et al. | 315—27 |
| 3,323,001 | 5/1967 | Machellar | 315—27 |

RODNEY D. BENNETT, Jr., *Primary Examiner.*

B. L. RIBANDO, *Assistant Examiner.*